US006573009B1

(12) United States Patent
Noda et al.

(10) Patent No.: US 6,573,009 B1
(45) Date of Patent: Jun. 3, 2003

(54) ELECTROLYTE CONTAINING A CROSSLINKED COMPOUND HAVING ETHER LINKAGES AND A HIGH-MOLECULAR COMPOUND

(75) Inventors: Kazuhiro Noda, Kanagawa (JP); Takeshi Horie, Kanagawa (JP); Toshikazu Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/509,409

(22) PCT Filed: Aug. 3, 1999

(86) PCT No.: PCT/JP99/04181

§ 371 (c)(1),
(2), (4) Date: Mar. 27, 2000

(87) PCT Pub. No.: WO00/08654

PCT Pub. Date: Feb. 17, 2000

(30) Foreign Application Priority Data

Aug. 5, 1998 (JP) ............................................. 10-222148

(51) Int. Cl.[7] ................................................. H01M 6/18
(52) U.S. Cl. ........................ 429/313; 429/304; 429/309
(58) Field of Search ................................ 429/304, 309, 429/313

(56) References Cited

U.S. PATENT DOCUMENTS 5,037,712 A * 8/1991 Shackle et al. ............. 429/192

5,968,681 A * 10/1999 Miura et al. ................. 429/122

FOREIGN PATENT DOCUMENTS

JP     2-24976      1/1990
JP     2-295005     5/1990

OTHER PUBLICATIONS

Article entitled Polymer Electrolyte Complexes of LiClO$_4$ and Comb Polymers of Siloxane with Oligo–oxyethylene Side Chains, British Polymer Journal, vol. 20 No. 3 1988, pp. 281–288.

* cited by examiner

*Primary Examiner*—Carol Chaney
*Assistant Examiner*—Dah-Wei D. Yuan
(74) *Attorney, Agent, or Firm*—Sonnenschein, Nath & Rosenthal

(57) ABSTRACT

A negative electrode (11) and a positive electrode (12) are arranged facing each other with an electrolyte (13) set between. The electrolyte (13) is obtained through polymerizing compounds for an electrolyte including compounds having ether linkages and functional groups capable of forming crosslinks, a siloxane derivative, and lithium salt. The compounds having ether linkages and functional groups capable of forming crosslinks form a three-dimensional network structure by polymerization. The siloxane derivative and lithium salt are compatible with the structure. This maintains high ability to be formed a film of great film strength, while increasing ion conductivity.

8 Claims, 1 Drawing Sheet

ELECTROLYTE CONTAINING A CROSSLINKED COMPOUND HAVING ETHER LINKAGES AND A HIGH-MOLECULAR COMPOUND

TECHNICAL FIELD

The present invention relates to a compound for an electrolyte including a polymer compound and electrolyte salt. The invention also relates to an electrolyte, a process for producing the same and a battery using the same.

BACKGROUND ART

Recently, portable electrical products, such as a camcorder (video tape recorder), a cellular phone, and a laptop computer, are spreading quickly. Such electrical products require even higher performance of their electrochemical devices.

Conventional electrochemical devices such as a secondary battery utilize a liquid electrolyte obtained through dissolving electrolyte salt in, for example, water or flammable organic solvent as a substance to control ion conduction. However, since a liquid electrolyte has problems such as leaking, it is necessary to ensure liquid-tightness by using a metal container. Therefore, an electrochemical device generally becomes heavier and has the less versatility of possible form features. Furthermore, the sealing process is usually complicated. Research has been therefore made on so-called solid electrolytes, which consist of ion conductive solid. Solid electrolytes have no liquid leak. Solid electrolytes also have several other advantages, that is, simplified sealing process, lighter device, and the flexibility of the form selection due to the excellent ability of polymer to be molded into films.

Generally a solid electrolyte consists of a matrix polymer and electrolyte salt from which ion can be dissociated. The matrix polymer has ion dissociation power and has two functions: keeping this ion conductive solid in solid state and behaving as a solvent for electrolyte salt. Armand et al. at the Grenoble University (France) made a report on an example of the solid electrolytes in 1978; they achieved the ion conductivity of the order of $1 \times 10^{-7}$ S/cm in a system where lithium perchlorate was dissolved in polyethylene oxide. Since then, a variety of polymer materials are still examined actively, especially a polymer having a polyether linkage.

The solid electrolyte utilizes a normal chain polyether typified by polyethylene oxide as a matrix. This type of solid electrolyte achieves its ion conductivity by transferring the dissociated ions in the amorphous phase at the temperature above the glass transition point of the matrix polymer by the local segment movement of a polymer chain.

However, the ions, especially cations, dissociated into the normal chain matrix such as a polyethylene oxide, which is a semi-crystalline polymer, are strongly coordinated by the interaction with the polymer chain, and forms a pseudo-crosslinking point. This causes partial crystallization, which reduces the segment movement. In order to increase ion conductivity at room temperature, it is necessary to increase the ion dissociation power of the electrolyte salt and to develop a desirable molecular design for the polymer so that the polymer has many amorphous domains where the ions can move easily within a matrix, and the glass transition point of the polymer is kept lower.

In one molecular design, a branch structure is introduced into the polyethylene oxide frame in an attempt to increase ion conductivity (see Masayoshi Watanabe, Netsu Sokutei 24 (1) pp12–21, 1996). However, the synthesis of this type of polymer requires a complicated process.

In another molecular design, a three-dimensional network structure is introduced into a matrix polymer in an attempt to prevent the crystallization of polymer. This molecular design is applied to, for example, a polymer obtained by polymerizing acrylic or methacrylic monomers with polyoxyalkylene components (see Japanese Non-examined Patent Publication No. 5-25353). However, since alkali metal salt is not dissolved in a monomer very well, sufficient ion conductivity cannot be achieved. Therefore, it is necessary to obtain an alternative solid electrolyte.

DISCLOSURE OF THE INVENTION

The present invention has been made in view of such problems. An object of the present invention is to provide a compound for an electrolyte, and an electrolyte, a process for producing the same, and a battery using the same, capable of achieving high ion conductivity.

A compound for an electrolyte according to the present invention comprises a crosslinkable compound having an ether linkage and a functional group capable of forming a crosslink, a high-molecular compound, and electrolyte salt.

The compound for an electrolyte according to the present invention comprises a crosslinkable compound having an ether linkage and a functional group capable of forming a crosslink, a high-molecular compound, and electrolyte salt. This makes it possible to obtain an electrolyte which achieves high ion conductivity.

An electrolyte according to the present invention comprises a compound in which compounds having ether linkages and crosslinking groups are crosslinked by the crosslinking groups, a high-molecular compound, and electrolyte salt.

In the electrolyte according to the present invention, the high-molecular compound and the dissociated electrolyte salt are compatible with the compound in which compounds having ether linkages and crosslinking groups are crosslinked by the crosslinking groups. This enables the electrolyte to achieve high ion conductivity.

A process for producing an electrolyte according to the present invention involves: mixing crosslinkable compounds having ether linkages and functional groups capable of forming crosslinks, a high-molecular compound, and electrolyte salt; and crosslinking the crosslinkable compounds.

In the process for producing an electrolyte according to the present invention, crosslinkable compounds having ether linkages and functional groups capable of forming crosslinks, a high-molecular compound, and electrolyte salt are mixed, and the crosslinkable compounds are crosslinked.

Another process for producing an electrolyte according to the present invention involves: mixing crosslinkable compounds having ether linkages and functional groups capable of forming crosslinks, and a high-molecular compound; crosslinking the crosslinkable compounds; and adding electrolyte salt.

In the process for producing an electrolyte according to the present invention, crosslinkable compounds having ether linkages and functional groups capable of forming crosslinks, and a high-molecular compound are mixed, and the crosslinkable compounds are crosslinked. After that, electrolyte salt is added.

A battery according to the present invention comprises a positive electrode and a negative electrode, and an electrolyte, wherein the electrolyte comprises a compound in which compounds having ether linkages and crosslinking groups are crosslinked by the crosslinking groups, a high-molecular compound, and electrolyte salt.

The battery according to the present invention discharges as ions dissociated from the electrolyte salt move in the electrolyte between the negative electrode and the positive electrode. The battery, including the electrolyte according to the present invention, exhibits high ion conductivity and has high performance.

Other and further objects, features and advantages of the invention will appear more fully from the following description.

BEST MODE FOR CARRYING OUT THE INVENTION

Figure 1:
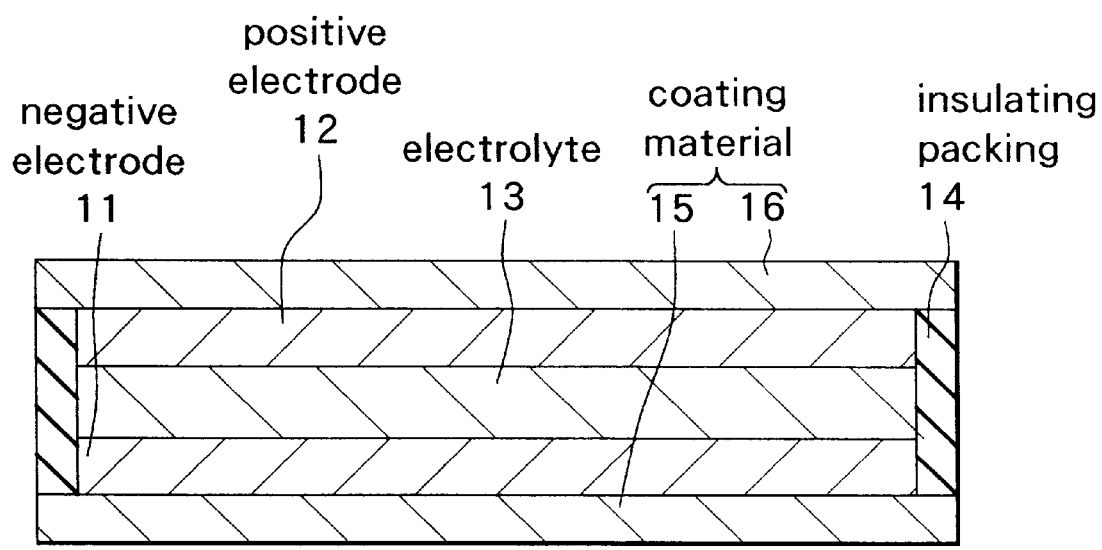
FIG. 1 is a sectional view illustrating the composition of a secondary battery using an electrolyte according to one embodiment of the present invention.

Embodiments of the present invention will now be described below in detail.

An electrolyte according to one embodiment of the present invention includes a compound having a three-dimensional network structure in which compounds having ether linkages and crosslinking groups are crosslinked by the crosslinking groups, a high-molecular compound, and electrolyte salt. The reasons why the electrolyte includes a crosslinked compound having a three-dimensional network structure are as follows: if the electrolyte includes only a high-molecular compound, the electrolyte cannot form a film since a high-molecular compound exhibits fluidity as the molecular weight of the high-molecular compound reduces; moreover, it is also difficult to obtain sufficiently great film strength even if the high-molecular compound is of high molecular weight. In other words, the purpose of the crosslinked compound having a three-dimensional network structure is that the three-dimensional network structure is compatible with a high-molecular compound and electrolyte salt to ensure the ability to be formed into a film and great film strength.

Among the crosslinked compound is a compound having a structure in which at least either normal chain compounds or comb compounds are crosslinked by crosslinking groups. The crosslinked compound may include a side chain. Furthermore, it is sufficient that the crosslinked compound has a structure in which compounds including linear atom arrangement at least in part are crosslinked. The crosslinked compound is not limited to compounds in which linear compounds are crosslinked. The crosslinked compound may have a structure in which compounds having cyclic atom arrangement in part are crosslinked. That is, the crosslinked compound may have a cyclic atom arrangement in its main chain or in its side chain.

It is sufficient that the crosslinked compound is a compound in which compounds having at least one crosslinking group are crosslinked. The position of a crosslinking group is not limited. For example, if normal chain compounds are crosslinked, it is acceptable that compounds having crosslinking groups at both ends are crosslinked, or that compounds having crosslinking groups at one end are crosslinked. If comb compounds are crosslinked, it is acceptable that compounds having crosslinking groups at least at one end are crosslinked. In short, it is sufficient that the crosslinked compound forms a three-dimensional network structure compatible with a high-molecular compound and electrolyte salt.

To achieve higher ion conductivity, however, it is preferable that the crosslinked compound has a structure in which compounds having no crosslinking groups but at least one free end including an ether linkage. This introduces a branched structure into the three-dimensional network structure and thus the three-dimensional network structure comes to have a free-end side chain including an ether linkage. For example, if normal chain compounds are crosslinked, it is preferable that the crosslinked compound has a structure in which compounds having crosslinking groups at one end are crosslinked, in addition to a structure in which compounds having crosslinking groups at both ends are crosslinked. If comb compounds are crosslinked, it is preferable that the crosslinked compound has a structure in which comb compounds having at least one free end with no crosslinking groups are crosslinked. Furthermore, if normal chain compounds and comb compounds are crosslinked, it is preferable that the crosslinked compound has a structure in which normal chain compounds having crosslinking groups at one end are crosslinked or a structure in which comb compounds having at least one free end with no crosslinking groups are crosslinked.

The crosslinked compound may also have a crosslinked structure of any linkages including ether linkages, ester linkages or urethan linkages. For example, the crosslinked compound may be a compound having a crosslinked structure in which compounds having an allyl group, a vinyl group, an acrylate group, a methacrylate group, a functional group having a cycloolefin structure or an active hydrogen group are crosslinked thereby. It is also acceptable that a plurality of different crosslinked structures are included in one compound.

Among such crosslinked compounds is, to be specific, a compound having a crosslinked structure in which ester compounds are crosslinked by crosslinking groups; preferably a compound having a structure in which at least either monoester compounds, diester compounds or triester compounds are crosslinked. For example, compounds having structures in which diester compounds are croslinked include a compound having a structure in which diester compounds including an oxyalkylene structure corresponding to a general formula shown later in Chemical Formula 1 are crosslinked by crosslinking groups.

In this case, preferably, the crosslinked compound includes a structure in which monoester compounds including an oxyalkylene structure corresponding to a general formula shown later in Chemical Formula 2, in addition to a structure in which diester compounds corresponding to the general formula shown in Chemical Formula 1. As mentioned above, this introduces a free-end side chain including an ether linkage, which contributes to higher ion conductivity.

In this case, in a structure in which diester compounds are crosslinked by crosslinking groups and a structure in which monoester compounds are crosslinked by crosslinking groups, preferably, a weight ratio of monoester compounds to diester compounds (monoester compounds/diester compounds) is in a range from 0 exclusive to 5.0 inclusive. The reason is as follows: if there are few structures in which diester compounds are crosslinked, a three-dimensional network structure cannot be formed; on the other hand, there are few structures in which monoester compounds are crosslinked, there are few free-end side chains including ether linkages and high ion conductivity cannot be achieved.

An example of compounds having a structure in which triester compounds are crosslinked is a compound having a structure in which triester compounds including an oxyalkylene structure corresponding to a general formula shown later in Chemical Formula 3 are crosslinked by crosslinking groups.

In the triester compound corresponding to Chemical Formula 3, a composition ratio between an oxyethylene unit and an oxypropylene unit is not particularly limited, but preferably in a range of $0.1 \leq q/p \leq 4$. If there are too few oxyethylene units, mechanical strength of the crosslinked compound decreases; too many oxyethylene units makes the crosslinked compound fragile. Oxyethylene units and oxypropylene units may be bonded in a block fashion or in a random fashion, and preferably in a random fashion.

In this case too, as described above, it is preferable that the crosslinked compound has a structure in which monoester compounds corresponding to a general formula shown in Chemical Formula 2 are crosslinked by crosslinking groups, in addition to a structure in which triester compounds corresponding to a general formula shown in Chemical Formula 3 are crosslinked by crosslinking groups.

Another example of the crosslinked compounds is a compound having a structure in which copolymers including structural units corresponding to Chemical Formula 4 shown later and structural units corresponding to Chemical Formula 5 shown later are crosslinked by crosslinking groups. In this compound, the structural unit corresponding to Chemical Formula 4 introduces a free-end side chain including an ether linkage. This compound achieves high ion conductivity and thus is preferable.

In the copolymer, a composition ratio between structural units corresponding to Chemical Formula 4 and structural units corresponding to Chemical Formula 5 is not particularly limited. Structural units corresponding to Chemical Formula 4 and structural units corresponding to Chemical Formula 5 may be bonded in a block fashion or in a random fashion. In this copolymer, a functional group capable of forming a crosslink is an active hydrogen group and a functional group having an unsaturated double bond. Among functional groups having unsaturated double bonds are an allyl group, a vinyl group, an acrylate group, a metacrylate group, and a functional group having a cycloolefin structure.

Specifically, a preferable example of crosslinked compounds having such structures is a compound in which copolymers corresponding to a general formula shown later in Chemical Formula 6 are crosslinked by crosslinking groups. The copolymer corresponding to Chemical Formula 6 includes structural units corresponding to Chemical Formula 4 wherein k equals to 2 and $R_{10}$ is a methyl group, structural units corresponding to Chemical Formula 5 wherein $R_{11}$ is a hydrogen atom, and structural units corresponding to Chemical Formula 5 wherein $R_{11}$ is an allyl group.

For the crosslinked compound, a plurality of compounds having different structures may be mixed and used. For example, it is acceptable to mix and use a compound having a structure in which ester compounds corresponding to Chemical Formula 1 are crosslinked and a compound having a structure in which copolymers including structural units corresponding to Chemical Formula 4 and structural units corresponding to Chemical Formula 5 are crosslinked.

The purpose of a high-molecular compound is to dissolve electrolyte salt. An example of the high-molecular compound a chain siloxane derivative corresponding to $(SiOCH_3R)_n$ which has a chain bond between silicon (Si) and oxygen (O) as a base frame with a side chain group R added to silicon. In this case, a substituent or a side chain group R is a monovalent organic group. Selection of an appropriate side chain group R forms a structure capable of dissolving electrolyte salt. It is therefore preferable that an average molecular weight of the siloxane derivative be smaller than or equal to 100000.

This siloxane derivative requires not only the ability to dissolve electrolyte salt effectively but also high compatibility with a compound in which compounds having ether linkages are crosslinked by crosslinking groups. Thus, preferably, the siloxane derivative includes an ether linkage in the substituent or a side chain group R. Among such side chain groups R are an alkoxy group such as an ethoxy group, a propoxy group, a butoxy group or a methoxy group. Hydrogen in the side chain group R may be substituted by a halogen such as boron or fluorine.

A preferable example of such siloxane derivatives corresponds to a general formula shown later in Chemical Formula 7.

The purpose of the electrolyte salt is to exhibit ion conductivity through dissociation. The electrolyte salt corresponds to a general formula shown later in Chemical Formula 8.

An example of the electrolyte salt is a light metal salt, and selected according to applications from, specifically, alkali metal salt e.g. lithium (Li) salt, sodium (Na) salt, and potassium (K) salt, alkaline earth metal salt e.g. calcium (Ca) salt and magnesium (Mg) salt. Among lithium salt are $LiClO_4$, $LiBF_4$, $LiPF_6$, $LiAsF_6$, $LiAlCl_4$, $LiSbF_6$, $LiCF_3SO_3$, $LiN(CF_3SO_2)_2$, $LiC_4F_9SO_3$, $LiCF_3CO_2$, $LiN(CF_3CO_2)_2$. Among sodium salt are $NaClO_4$, $NaBF_4$, $NaSCN$. Among potassium salt is $KBF_4$. Any one sort, or two or more sorts thereof are mixed in use.

As to a ratio between the crosslinked compound and the high-molecular compound, if a siloxane derivative is used as the high-molecular compound, it is preferable that the crosslinked compound be used in a range from 10 to 10000 parts both inclusive by weight to 100 parts by weight of the siloxane derivative. If the crosslinked compound is less than 10 parts by weight, sufficient film strength cannot be obtained. If the crosslinked compound is more than 10000 parts by weight, the film can be fragile or hard. However, these conditions may vary depending on the molecular weight of the siloxane derivative or the application of the electrolyte.

As to a ratio between the crosslinked compound and the electrolyte salt, it is preferable that a ratio of the number of moles of the electrolyte salt to the number of moles of the ether linkage unit in the crosslinked compound (the number of moles of the electrolyte salt/the number of moles of the ether linkage unit in the crosslinked compound) be in a range from 0.0001 to 5 both inclusive. Similarly, as to a ratio of the electrolyte salt to the siloxane derivative, it is preferable that a ratio of the number of moles of the electrolyte salt to the number of moles of the ether linkage unit in the siloxane derivative (the number of moles of the electrolyte salt/the number of moles of the ether linkage unit in the siloxane derivative) be in a range from 0.0001 to 5 both inclusive. This is because high ion conductivity can be obtained if the ratio is in this range.

The number of moles of the ether linkage unit in 1 mol of the diester compound corresponding to Chemical Formula 1 is given by $(1+x+y)$ mol. The number of moles of the ether linkage unit in 1 mol of the copolymer corresponding to Chemical Formula 6 is given by $\{i+(1+1+2) \times j+(1+1) \times k\}$ mol.

The electrolyte with the structure described above can be produced as follows, using the following compound for the electrolyte.

Firstly, a compound for the electrolyte is prepared. The compound for the electrolyte includes crosslinkable compounds having ether linkages and functional groups capable of forming crosslinks, a high-molecular compound and electrolyte salt. The high-molecular compound and the electrolyte salt are as have been described above. For example, the high-molecular compound is a siloxane derivative and the electrolyte salt is at least one kind of lithium salt.

The crosslinkable compounds are crosslinked to form a crosslinked compound having a three-dimensional network structure. The crosslinkable compounds may be normal chain compounds, comb compounds or the mixture thereof, which may have side chains. So long as the crosslinkable compound has a linear atom arrangement at least in part, the crosslinkable compound may be a chain compound or a compound having a cyclic atom arrangement at least in part of the main chain or a side chain. Furthermore, it is sufficient that each crosslinkable compound has at least one functional group capable of forming a crosslink; there is no limit concerning the numbers or positions of the functional groups capable of forming crosslinks. For example, if the crosslinkable compounds are normal chain compounds, each crosslinkable compound may have a functional group capable of forming a crosslink at both ends or at only one end. If the crosslinkable compounds are comb compounds, each crosslinkable compound may have a functional group capable of forming a crosslink at least at one end; also, the crosslinkable compounds may be polyfunctional, having more than three functional groups capable of forming crosslinks.

The crosslinkable compound may have any functional groups as the functional groups capable of forming crosslinks. Specific examples are an ester compound and a compound having an allyl group. Among ester compounds are a monoester compound, a diester compound, a triester compound or a compound having four or more ester linkages. Moreover, the crosslinkable compounds may include a plurality of kinds of compounds different from each other regarding the number of the functional groups capable of forming crosslinks. The crosslinkable compounds may include a plurality of kinds of compounds different from each other regarding the kinds of functional groups capable of forming crosslinks.

Examples of the crosslinkable compounds are a diester compound corresponding to a general formula shown in Chemical Formula 1, a monoester compound corresponding to a general formula shown in Chemical Formula 2 and a triester compound corresponding to a general formula shown in Chemical Formula 3. If the diester compound corresponding to Chemical Formula 1 is adopted, it is preferable that the crosslinkable compound includes a monoester compound corresponding to Chemical Formula 2 in addition to the diester compound corresponding to Chemical Formula 1. This is for the purpose of forming a free-end side chain including an ether linkage when being crosslinked, as described above. In this case, a weight ratio of the monoester compound to the diester compound (monoester compound/diester compound) is preferably in a range from 0 exclusive to 5.0 inclusive. On the other hand, if the triester compound corresponding to Chemical Formula 3 is utilized, it is preferable that the crosslinkable compound includes a monoester compound corresponding to Chemical Formula 2 in addition to the triester compound corresponding to Chemical Formula 3.

Another example of the crosslinkable compound is a copolymer including structural units corresponding to Chemical Formula 4 and structural units corresponding to Chemical Formula 5. Specifically, a copolymer corresponding to Chemical Formula 6 is desirable.

A ratio between the crosslinkable compounds and the high-molecular compound is as has been described above; that is, if the high-molecular compound is a siloxane derivative, it is desirable that the crosslinkable compound be used in a range from 10 to 10000 parts both inclusive by weight to 100 parts by weight of the siloxane derivative. As described above, as to a ratio of the electrolyte salt to the crosslinkable compound, it is preferable that a ratio of the number of moles of the electrolyte salt to the number of moles of the ether linkage unit of the crosslinkable compound (the number of moles of the electrolyte salt/the number of moles of the ether linkage unit in the crosslinkable compound) be in a range from 0.0001 to 5 both inclusive. As to a ratio of the electrolyte salt to the siloxane derivative, it is preferable that a ratio of the number of moles of the electrolyte salt to the number of moles of the ether linkage unit in the siloxane derivative (the number of moles of the electrolyte salt/the number of moles of the ether linkage unit in the siloxane derivative) be in a range from 0.0001 to 5 both inclusive.

Next, the crosslinkable compounds having ether linkages and functional groups capable of forming crosslinks, the high-molecular compound and the electrolyte salt are mixed to become a uniform mixture. A polymerization initiator is also added if needed. This polymerization initiator is needed except when the polymerization is performed by the irradiation of an electron ray. Examples include an optical polymerization initiator and a heat polymerization initiator.

Among optical polymerization initiators are acetophenone, trichloroacetophenone, 2-hydroxy-2-methyl propiophenone, 2-hydroxy-2-methyl isopropiophenone, 1-hydroxycyclohexylketone, benzoisoether, 2,2-diethoxyacetophenone and benzyldimethylketal. Among heat polymerization initiators are high-temperature polymerization initiators such as cumene hydroperoxide, tert-butylhydroperoxide, dicumyl peroxide and di-tert-butyl peroxide, initiators such as benzoyl peroxide, lauroyl peroxide, persulfate and azobisisobutyronitrile, and a redox initiator. One sort, or two or more sorts of these polymerization initiators may be mixed in use.

A polymerization initiator is added in a range from 0.1 to 1.0 part by weight to 100 parts by weight of the crosslinkable compound having ether linkages and functional groups capable of forming crosslinks. If the polymerization initiator is less than 0.1 part by weight, the polymerization speed falls remarkably. On the other hand, even if more than 1.0 part by weight of the polymerization initiator is added, no change in effect is observed.

Then, an ultraviolet ray, an electron ray, X-rays, a gamma ray, microwave, or a high-frequency discharge is irradiated at the mixture, or alternatively the mixture is heated. Thus the crosslinkable compounds are polymerized. Thereby the electrolyte according to the present embodiment is prepared.

When mixing the crosslinkable compounds, the high-molecular compound and electrolyte salt, proper organic solvents, such as acetonitrile, may be used to form a mixture. In this case, the organic solvent may be removed by drying treatment, for example, leaving or heating the crosslinkable compounds in the air or under a reduced pressure after polymerizing. Alternatively, the crosslinkable compounds may be polymerized after preparing the mixture, then drying the mixture and removing the organic solvent.

This electrolyte also can be prepared as follows.

Crosslinkable compounds having ether linkages and functional groups capable of forming crosslinks, the high-molecular compound and electrolyte salt are used as in the previous production process. The crosslinkable compounds and the high-molecular compound are mixed. A polymerization initiator is added if needed. Then, the crosslinkable compounds are polymerized as in the previous preparing process, and the mixture of a compound in which the crosslinkable compounds are crosslinked by crosslinking groups and the high-molecular compound is formed. After that, electrolyte salt is dissolved in the organic solvent and penetrated into the mixture. Then the organic solvent is dried and removed. Thereby, the electrolyte according to the present embodiment is obtained.

The conditions of the polymerization reaction in each of the above-mentioned production process are not particularly limited. However, the polymerization reaction by the ultraviolet ray irradiation or the heating polymerization is desirable in view of the simple equipment and a low cost. When producing an electrolyte used for a lithium battery using alkali metal ion, a lithium ion battery, and a sodium battery, it is preferable that the compounds for the electrolyte (namely, the crosslinkable compounds, the high-molecular compound and alkali metal salt), the solvent for mixing these compounds for the electrolyte and the polymerization initiator be fully dehydrated. It is also preferable that the atmosphere during the production be kept in low humidity. This is because some kinds of alkali metal salt is decomposed by reacting with moisture, and because alkali metal and moisture react intensely in the negative electrode when used in a battery.

The electrolyte prepared in this way is used for a battery as follows. Description given below with reference to the drawing relates to an example of a secondary battery using lithium.

FIG. 1 shows a cross-sectional structure of a secondary battery using the electrolyte according to the present embodiment. The battery shown in FIG. 1 is a so-called paper type. In the secondary battery, a negative electrode 11 and a positive electrode 12 are laminated with the electrolyte 13 according to the present embodiment in between. Insulating packing 14 is placed on the side faces of the negative electrode 11, the positive electrode 12, and the electrolyte 13. The negative electrode 11, the positive electrode 12 and the electrolyte 13 are sealed by pasting the insulating packing 14 onto the circumferential edges of a pair of coating materials 15 and 16 which are placed to sandwich the negative electrode 11 and the positive electrode 12 in between.

The negative electrode 11 contains metal, alloy or carbon materials that can occlude and eliminate lithium metal or lithium ion, for example. This carbon material is prepared at a predetermined temperature and in a predetermined atmosphere. Examples of the carbon materials are heat decomposition carbon, coke such as petroleum coke or pitch coke, artificial graphites, natural graphites, carbon black such as acetylene black, glass-like carbon, an organic polymer-material calcine, or a carbon fiber. The organic polymer-material calcine is obtained by calcinating an organic polymer material at an appropriate temperature of 500° C. or above in an inactive gas atmosphere or in a vacuum.

The positive electrode 12 contains, for example, the metal sulfide or the oxide, which does not contain lithium, such as $TiS_2$, $MoS_2$, $NbSe_2$, or $V_2O_5$, or a lithium compound sulfide or a lithium compound oxide containing lithium, as a positive electrode active material. In particular, in order to increase energy density, it is desirable that the positive electrode 12 include the lithium compound oxide which contains mainly $Li_xMO_2$, wherein M is one or more kinds of transition metals and preferably at least one among cobalt (Co), nickel (Ni) and manganese (Mn), and where x is usually a value within the range of $0.05 \leq x \leq 1.10$. Examples of the lithium compound oxides are $LiCoO_2$, $LiNiO_2$, $Li_xNi_yCo_{1-y}O_2$ (wherein x and y usually vary in the range of $0<x<1$ and $0.7<y\leq1$ respectively depending on the charge and discharge condition of a battery), and $LiMn_2O_4$.

The lithium compound oxide is prepared in the following way: carbonic acid salt, a nitrate, an oxide or hydroxide of lithium, and carbonic acid salt, a nitrate, an oxide or hydroxide of a transition metal are pulverized and mixed according to desired composition and calcinated in an oxygen atmosphere at the temperature within the range of 600 to 1000° C.

The electrolyte 13 contains lithium salt as electrolyte salt. In addition, the electrolyte 13 also serves as a separator in this secondary battery. That is, the negative electrode 11 and the positive electrode 12 are isolated by the electrolyte 13 so that lithium ions are passed through the electrolyte 13 while two poles are prevented from the short caused by the contact. In addition, a separator, not shown, may be provided between the negative electrode 11 and the electrolyte 13, between the positive electrode 12 and the electrolyte 13, or into electrolyte 13 if needed. Among the separators are one made of a nonwoven fabric made from synthetic resins such as polytetrafluoroethylene, polypropylene, or polyethylene, one made of a ceramic film, and one made of a porous thin film.

The secondary battery with the structure described above acts as follows.

When the secondary battery is charged, lithium is dissociated as ions from the positive electrode 12, and occluded to the negative electrode 11 through the electrolyte 13. Then, if the secondary battery is discharged, lithium is dissociated as ions from the negative electrode 11 and the ions return to the positive electrode 12 through the electrolyte 13 and are occluded to the positive electrode 12. The electrolyte 13 comprises a compound in which compounds having ether linkages and crosslinking groups are crosslinked by the crosslinking groups; the three-dimensional network structure thereof is compatible with the high-molecular compounds and lithium ions. Thus, the electrolyte 13 is easily formed into a film with great strength, while achieving high ion conductivity. Therefore, the battery exhibits high performance.

As described above, the electrolyte according to the present embodiment comprises a compound in which compounds having ether linkages and crosslinking groups are crosslinked by the crosslinking groups and a high-molecular compound; the three-dimensional network structure thereof can be compatible with the high-molecular compound and the electrolyte salt. Thus, the electrolyte according to the present embodiment is easily formed into a film with great strength, while achieving high ion conductivity. Therefore, if an electrochemistry device is constructed using this electrolyte, the electrochemical device with high performance can be obtained easily.

Moreover, if the crosslinked compound has a free-end side chain including an ether linkage, it is possible to expect higher ion conductivity.

Furthermore, the compound for the electrolyte according to the present embodiment includes a crosslinkable compound having an ether linkage and a functional group capable of forming a crosslink, and a high-molecular compound. The crosslinkable compounds can be therefore easily polymerized through irradiation of ultraviolet rays or heating. Thus, the electrolyte according to the present embodiment can be obtained easily.

In addition, in the process for producing the electrolyte according to the present embodiment, the crosslinkable compounds having ether linkages and functional groups capable of forming crosslinks, and the high-molecular compound are mixed. Then the crosslinkable compounds are polymerized. Thus, the electrolyte according to the present embodiment can be obtained easily.

Furthermore, the secondary battery according to the present embodiment utilizes an electrolyte comprising a compound in which compounds having ether linkages and functional groups capable of forming crosslinks are crosslinked by crosslinking groups. This contributes to high ability to be formed into films, great film strength, while achieving high ion conductivity. The secondary battery according to the present embodiment can be thus produced in an easy process and can expect high performance.

Description is now made in further detail of specific examples of the present invention.

EXAMPLE 1

First, to 50 parts by weight of acetonitrile ($CH_3CN$) as a solvent, were added and dissolved therein one part by weight of the siloxane derivative corresponding to Chemical Formula 9 shown later, and 1.0 mol of lithiumbis (trifluoromethylsulfonyl) imide ($Li(CF_3SO_2)_2N$) for 1 kg of the siloxane derivative. To this, then, were added two parts by weight of polyethylene glycol dimethacrylate corresponding to Chemical Formula 10 shown later and two parts by weight of the methoxy-polyethylene glycol monomethacrylate corresponding to Chemical Formula 11 shown later. The mixture stirred until uniform.

After the mixture had been kept at 25° C. under a reduced pressure and acetonitrile had been removed to be reduced to 15 parts by weight, was added 0.05 parts by weight of 2,2-dimethoxy 2,2'-phenylacetophenone as a polymerization initiator and dissolved therein. Then, the mixture was applied uniformly to the substrate made of Teflon. After that, the ultraviolet ray was irradiated with 6 mW/cm$^2$ of light quantity in the air at 25° C. for 20 minutes for the polymerization reaction. Then, the mixture was dried at 60° C. under a reduced pressure for six hours. The electrolyte produced was 100 µm thick.

The film of this electrolyte was clipped into the shape of a disk with the area of 0.7854 cm$^2$. The electrolyte disk was sandwiched between a pair of electrodes made of stainless steel. Ion conductivity was measured by the alternating-current impedance method. The result is shown in Table 1 later.

EXAMPLE 2

An electrolyte was produced as in Example 1 but with 0.5 parts by weight of the polyethylene glycol dimethacrylate corresponding to Chemical Formula 10 and 0.5 parts by weight of the methoxy-polyethylene glycol monomethacrylate corresponding to Chemical Formula 11. Ion conductivity of this electrolyte was measured as in Example 1. The result is also shown in Table 1.

EXAMPLE 3

An electrolyte was produced as in Example 1 but with 0.125 parts by weight of the polyethylene glycol dimethacrylate corresponding to Chemical Formula 10 and 0.125 parts by weight of the methoxy-polyethylene glycol monomethacrylate corresponding to Chemical Formula 11. Ion conductivity of this electrolyte was measured as in Example 1. The result is also shown in Table 1.

EXAMPLE 4

An electrolyte was produced as in Example 1 but with 1.33 parts by weight of the polyethylene glycol dimethacrylate corresponding to Chemical Formula 10 and 2.66 parts by weight of the methoxy-polyethylene glycol monomethacrylate corresponding to Chemical Formula 11. Ion conductivity of this electrolyte was measured as in Example 1. The result is also shown in Table 1.

EXAMPLE 5

An electrolyte was produced as in Example 1 but with 0.083 parts by weight of the polyethylene glycol dimethacrylate corresponding to Chemical Formula 10 and 0.166 parts by weight of the methoxy-polyethylene glycol monomethacrylate corresponding to Chemical Formula 11. Ion conductivity of this electrolyte was measured as in Example 1. The result is also shown in Table 1.

EXAMPLE 6

An electrolyte was produced as in Example 1 but with 4 parts by weight of the triacrylate compound corresponding to Chemical Formula 12 as a crosslinkable compound, instead of the polyethylene glycol dimethacrylate corresponding to Chemical Formula 10 and the methoxy-polyethylene glycol monomethacrylate corresponding to Chemical Formula 11. Ion conductivity of this electrolyte was measured as in Example 1. The result is also shown in Table 1.

EXAMPLE 7

An electrolyte was produced as in Example 1 but with 1 part by weight of the triacrylate compound corresponding to Chemical Formula 12, instead of the polyethylene glycol dimethacrylate corresponding to Chemical Formula 10 and the methoxy-polyethylene glycol monomethacrylate corresponding to Chemical Formula 11. Ion conductivity of this electrolyte was measured as in Example 1. The result is also shown in Table 1.

EXAMPLE 8

An electrolyte was produced as in Example 1 but with 0.25 parts by weight of the triacrylate compound corresponding to Chemical Formula 12, instead of the polyethylene glycol dimethacrylate corresponding to Chemical Formula 10 and the methoxy-polyethylene glycol monomethacrylate corresponding to Chemical Formula 11. Ion conductivity of this electrolyte was measured as in Example 1. The result is also shown in Table 1.

EXAMPLE 9

First, the siloxane derivative corresponding to Chemical Formula 9 and lithiumbis imide were mixed so that a ratio of the number of moles of lithiumbis imide to the mole number of moles of ether linkage unit in the siloxane derivative (the number of moles of lithium salt/the number of the ether linkage unit in the siloxane derivative) was 0.06, thereby regulating the mixture of the siloxane derivative.

Then, a solid-state random copolymer having the number average molecular weight of 820000 was prepared as a crosslinkable compound. The copolymer included 20.6 mol % of a structural unit corresponding to Chemical Formula 13 shown later, 77.5 mol % of a structural unit corresponding to Chemical Formula 14 and 1.9 mol % of a structural unit corresponding to Chemical Formula 15. The copolymer and lithiumbis imide were mixed so that a ratio of the number of moles of lithiumbis imide to the number of moles of the ether linkage unit in the copolymer (the number of moles of lithium salt/the number of moles of the ether linkage unit in the copolymer) was 0.06, thereby regulating the mixture of the copolymer.

Next, the mixture of the siloxane derivative and the mixture of the copolymer were mixed in acetonitrile so that a weight ratio of the mixture of the siloxane derivative to the mixture of the copolymer (the mixture of the siloxane derivative/the mixture of the copolymer) was 5/5. Then, 2,2-dimethoxy 2,2'-phenylacetophenone as a polymerization initiator was added to form a mixture solution.

After regulating the mixture solution, the mixture solution was applied uniformly to the substrate made of Teflon and subjected to vacuum drying at 25° C. After that, the ultraviolet ray was irradiated with 6 mW/cm$^2$ of light quantity in the air at 25° C. for 20 minutes for the polymerization reaction. Then, the mixture was dried at 60° C. under a reduced pressure for six hours. The electrolyte produced was 100 µm thick. Ion conductivity of this electrolyte was measured as in Example 1. The result is shown in Table 2 later.

EXAMPLE 10

An electrolyte was prepared as in Example 9 except that the mixture of the siloxane derivative and the mixture of the copolymer were mixed so that a weight ratio of the mixture of the siloxane derivative to the mixture of the copolymer (the mixture of the siloxane derivative/the mixture of the copolymer) was 7.5/2.5. Ion conductivity of this electrolyte was measured as in Example 1. The result is also shown in Table 2.

EXAMPLE 11

An electrolyte was prepared as in Example 9 except that the mixture of the siloxane derivative and the mixture of the copolymer were mixed so that a weight ratio of the mixture of the siloxane derivative to the mixture of the copolymer (the mixture of the siloxane derivative/the mixture of the copolymer) was 2.5/7.5. Ion conductivity of this electrolyte was measured as in Example 1. The result is also shown in Table 2.

COMPARATIVE EXAMPLE

Comparative Example with respect to Examples 9 to 11. An electrolyte was prepared as in Example 9 except that only the mixture of the copolymer was used without mixing the mixture of the siloxane derivative. Ion conductivity of this electrolyte was measured as in Example 1. The result is also shown in Table 2.

The results of Examples 1 to 8 and Examples 9 to 11 show that the electrolytes prepared in Examples all achieve the ion conductivity of 1×10$^{-5}$ S/cm or more and have sufficient ion conductivity for use in a battery. In addition, the results of Examples 9 to 11 and Comparative Example show that the ion conductivity achieved by the electrolytes of Examples 9 to 11 is higher than the ion conductivity achieved by the electrolyte of Comparative Example. In other words, it is found that the inclusion of a compound in which compounds having ether linkages and crosslinking groups are crosslinked by the crosslinking groups and a high-molecular compound such as a siloxane derivative contributes to higher ion conductivity. It is also found that the use of the electrolyte makes it possible to obtain high-performance batteries.

Although the invention has been described in its preferred embodiments and examples, this invention is not limited to the above-described embodiments and examples, and many changes and modifications are possible. For example, in the above-mentioned embodiment, the compounds having ether linkages and functional groups capable of forming crosslinks are crosslinked with each other. However, the crosslinkable compounds having ether linkages and other compounds may be crosslinked. In other words, it is sufficient that a compound in which compounds having ether linkages and crosslinking groups are crosslinked by the crosslinking groups includes, at least in part, a structure in which compounds having ether linkages and crosslinking groups are crosslinked.

Moreover, in the above-mentioned embodiment, specific description has been given with respect to ester compounds corresponding to Chemical Formula 1, Chemical Formula 2 and Chemical Formula 3 as compounds having ether linkages and functional groups capable of forming crosslinks, and a copolymer including structural units corresponding to Chemical Formula 4 and structural units corresponding to Chemical Formula 5. However, any other compounds having other structures may be utilized so long as an ether linkage and a functional group capable of forming a crosslink are included therein.

The above-described embodiment and examples relate to a siloxane derivative as a high-molecular compound. However, any other high-molecular compounds capable of dissolving an electrolyte salt may be utilized. In this case, it is acceptable to use a plurality of high-molecular compounds or to use other high-molecular compounds instead of or together with a siloxane derivative.

The above-described embodiment discloses a secondary battery utilizing lithium while the above-described examples relates to a case in which lithium salt is used as an electrolyte salt. However, the present invention may be also applied to an electrolyte and a secondary battery utilizing other electrolyte salt such as sodium salt or calcium salt.

In addition, although the paper type secondary battery has been explained in the above-mentioned embodiment, the present invention is applied with equal utility to a secondary battery with other forms, such as a button type, a coin model, a square type, and the pipe type which has a spiral structure.

While the electrolyte of the present invention has been used for a secondary battery in the above-mentioned embodiment, the electrolyte and the compound for the electrolyte of the present invention can be used for other batteries, such as a primary battery. The electrolyte and the compound for the electrolyte of the present invention can be also used for other electrochemical devices, such as a capacitor and an electrochromic element. In using the electrolyte of the present invention for a capacitor or others, a basic group salt such as ammonium salt may be used as an electrolyte salt.

As explained above, according to the compound for the electrolyte of the present invention, the compound for the electrolyte comprises a crosslinkable compound having an ether linkage and a functional group capable of forming a crosslink, and a high-molecular compound. It is therefore possible to obtain the electrolyte of the present invention through polymerization. This has an advantage that an electrolyte exhibiting high ability to be formed into films and achieving high ion conductivity is easily obtained. Furthermore, if a crosslinkable compound includes a compound having at least one free end having no functional group capable of forming a crosslink and having an ether linkage, a free-end side chain having an ether linkage is formed through polymerization, making it possible to obtain even higher ion conductivity.

According to the electrolyte of the present invention, the electrolyte includes a compound in which compounds having ether linkages and crosslinking groups are crosslinked by the crosslinking groups, and a high-molecular compound. The three-dimensional network structure thereof is compatible with the high-molecular compound and electrolyte salt. This enables high ability to be formed into films of great film strength, while increasing ion conductivity. Thus, if an electrochemical device is produced using this electrolyte, a high-performance electrochemical device can be obtained easily. Even higher ion conductivity can be obtained if the crosslinked compound has a free-end side chain including an ether linkage, or if the crosslinked compound has a structure in which the monoester compound corresponding to Chemical Formula 2 are crosslinked, or alternatively, if the crosslinked compound has a structure in which copolymers including structural units corresponding to Chemical Formula 4 are crosslinked by crosslinking groups.

According to the process for producing the electrolyte of the present invention or another process for producing the electrolyte of the present invention, the crosslinkable compounds having ether linkages and functional groups capable of forming crosslinks and the high-molecular compound are mixed, and then the crosslinkable compounds are polymerized. Therefore, the electrolyte of the present invention can be obtained easily.

According to the battery of the present invention, the battery uses the electrolyte of the present invention. This contributes both to high ability to be formed into films of great film strength and to high ion conductivity, making it possible to produce the battery with the high performance through an easy process.

Obviously many modifications and variations of the present invention are possible in the light of the above teachings. It is therefore to be understood that within the scope of the appended claims the invention may be practiced otherwise than as specifically described.

(Chemical Formula 1)

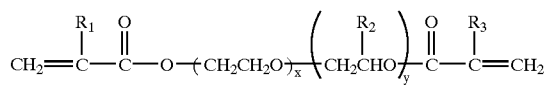

wherein $R_1$, $R_2$ and $R_3$ are a hydrogen atom or an alkyl group of carbon number 1 to 6, and where $x \geq 1$ and $y \geq 0$, or $x \geq 0$ and $y \geq 1$, both x and y being integers. $R_1$, $R_2$, and $R_3$ may be: (i) all the same, (ii) different from one another, or (iii) one of the three is different from the other two.

(Chemical Formula 2)

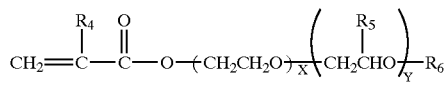

wherein $R_4$, $R_5$ and $R_6$ are a hydrogen atom or an alkyl group of carbon number 1 to 6, and where $X \geq 1$ and $Y \geq 0$, or $X \geq 0$ and $Y \geq 1$, both X and Y being integers. $R_4$, $R_5$, and $R_6$ may be: (i) all the same, (ii) different from one another, or (iii) one of the three is different from the other two.

(Chemical Formula 3)

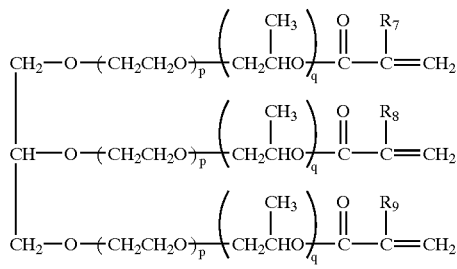

wherein $R_7$, $R_8$ and $R_9$ are a hydrogen atom or an alkyl group of carbon number 1 to 6, and where $p \geq 1$ and $q \geq 0$, or $p \geq 0$ and $q \geq 1$, both p and q being integers. $R_7$, $R_8$, and $R_9$ may be: (i) all the same, (ii) different from one another, or (iii) one of the three is different from the other two.

(Chemical Formula 4)

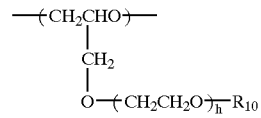

wherein $R_{10}$ is at least either an alkyl group of carbon number 1 to 12, an alkenyl group of carbon number 2 to 18, a cycloalkyl group of carbon number 3 to 8, an aryl group of carbon number 6 to 18, an aralkyl group of carbon number 7 to 12 or at tetrahydropyranyl group, and where h is an integer and $1 \leq h \leq 12$. $R_{10}$ may be the same in all the structural units, or different from one structural unit to another.

(Chemical Formula 5)

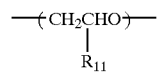

wherein $R_{11}$ is (i) at least either an active hydrogen group or a functional group having an unsaturated double bond, or (ii) at least either an active hydrogen group or a functional group having an unsaturated double bond, and at least either a hydrogen atom, an alkyl group, an alkenyl group, a cycloalkyl group or an aryl group. $R_{11}$ may be the same in all the structural units, or different from one structural unit to another.

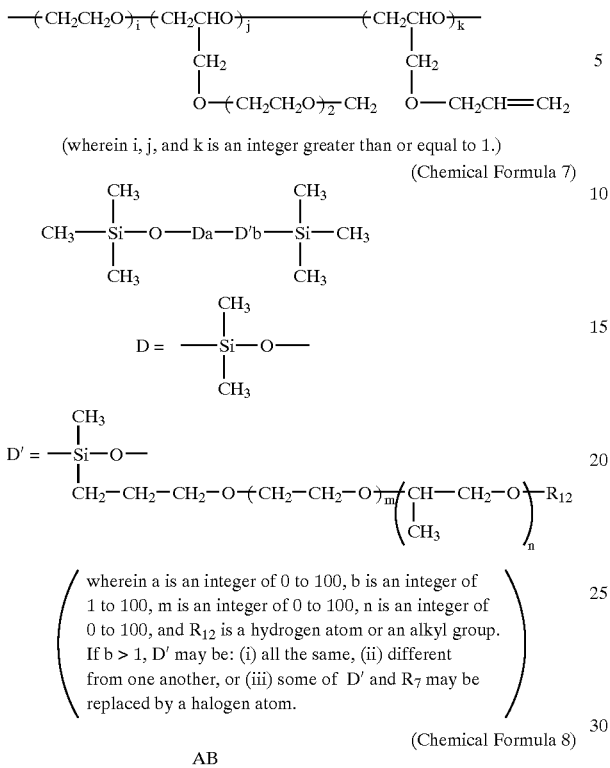

(Chemical Formula 6)

(wherein i, j, and k is an integer greater than or equal to 1.)

(Chemical Formula 7)

$$D = \begin{array}{c} CH_3 \\ | \\ -Si-O- \\ | \\ CH_3 \end{array}$$

(wherein a is an integer of 0 to 100, b is an integer of 1 to 100, m is an integer of 0 to 100, n is an integer of 0 to 100, and $R_{12}$ is a hydrogen atom or an alkyl group. If b > 1, D' may be: (i) all the same, (ii) different from one another, or (iii) some of D' and $R_7$ may be replaced by a halogen atom.)

(Chemical Formula 8)

AB (wherein A is a cation and B is an anion.)

(Chemical Formula 9)

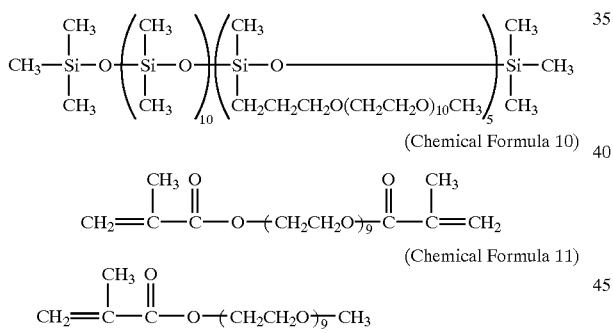

(Chemical Formula 10)

(Chemical Formula 11)

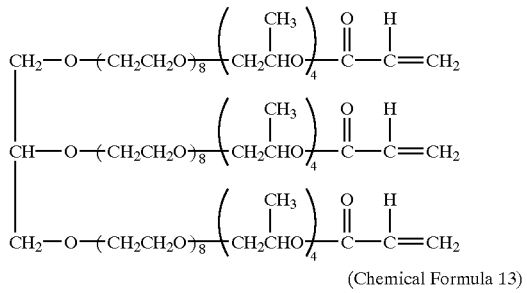

(Chemical Formula 12)

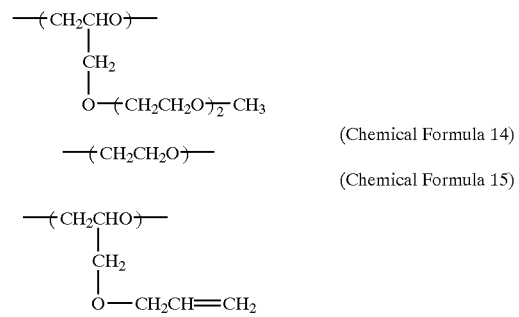

(Chemical Formula 13)

$$\begin{array}{c} -(-CH_2CHO-)- \\ | \\ CH_2 \\ | \\ O-(-CH_2CH_2O-)_{\overline{2}}CH_3 \end{array}$$

(Chemical Formula 14)

$$-(-CH_2CH_2O-)-$$

(Chemical Formula 15)

$$\begin{array}{c} -(-CH_2CHO-)- \\ | \\ CH_2 \\ | \\ O-CH_2CH=CH_2 \end{array}$$

TABLE 2

| | mixture ratio (weight ratio) mixture of siloxane derivative/ mixture of copolymer | ion conductivity (mS/cm) |
|---|---|---|
| Example 9 | 5/5 | 0.156 |
| 10 | 2.5/7.5 | 0.385 |
| 11 | 7.5/2.5 | 0.0958 |
| Comparative Example | 0/1 | 0.0103 |

What is claimed is:

1. A compound for an electrolyte, the compound comprising:
   a crosslinkable compound having an ether linkage and an ester functional group capable of forming a crosslink;
   a high-molecular compound; and
   electrolyte salt.

2. A compound for an electrolyte according to claim 1, wherein the crosslinkable compound includes at least either a monoester compound, diester compound or triester compound.

3. An electrolyte comprising:
   a compound in which compounds having ether linkages and structures in which ester compounds are crosslinked by crosslinking groups;
   a high-molecular compound; and
   electrolyte salt.

4. An electrolyte according to claim 3, wherein the crosslinked compound has a structure in which at least either monoester compounds, diester compounds or triester compounds are crosslinked by crosslinking groups.

5. A process for producing an electrolyte, wherein crosslinkable compounds having ether linkages and functional groups capable of forming crosslinks, and a high-molecular compound are mixed, and the crosslinkable compounds are crosslinked, and then electrolyte salt is added.

TABLE 1

| | amount of crosslinkable compounds added (parts by weight) | | | |
|---|---|---|---|---|
| | dimethacrylate compound corresponding to Chemical Formula 28 | monomethacrylate compound corresponding to Chemical Formula 29 | triacrylate compound corresponding to Chemical Formula 30 | ion conductivity (mS/cm) |
| Example 1 | 2 | 2 | — | 0.15 |
| 2 | 0.5 | 0.5 | — | 0.22 |
| 3 | 0.125 | 0.125 | — | 0.43 |
| 4 | 1.33 | 2.66 | — | 0.23 |
| 5 | 0.83 | 0.166 | — | 0.51 |
| 6 | — | — | 4 | 0.016 |
| 7 | — | — | 1 | 0.067 |
| 8 | — | — | 0.25 | 0.31 |

6. A process for producing an electrolyte according to claim 5, wherein the crosslinkable compounds are crosslinked by irradiating ultraviolet rays, electron beams, X rays, gamma rays, microwaves or high-frequency discharge.

7. A battery comprising a positive electrode and a negative electrode, and an electrolyte, wherein the electrolyte comprises a compound in which compounds having ether linkages and structures in which ester compounds are crosslinked by crosslinking groups, a high-molecular compound; and electrolyte salt.

8. A battery according to claim 7, wherein the crosslinked compound has a structure in which at least either monoester compounds, diester compounds or triester compounds are crosslinked by crosslinking groups.

* * * * *